(12) United States Patent
Novak (10) Patent No.: US 8,937,725 B2
(45) Date of Patent: Jan. 20, 2015

(54) MEASUREMENT ASSEMBLY INCLUDING A METROLOGY SYSTEM AND A POINTER THAT DIRECTS THE METROLOGY SYSTEM

(71) Applicant: Nikon Corporation, Tokyo (JP)

(72) Inventor: W. Thomas Novak, Redwood City, CA (US)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 13/797,420

(22) Filed: Mar. 12, 2013

(65) Prior Publication Data

US 2013/0335749 A1    Dec. 19, 2013

Related U.S. Application Data

(60) Provisional application No. 61/659,885, filed on Jun. 14, 2012.

(51) Int. Cl.
| | |
|---|---|
| *G01B 11/25* | (2006.01) |
| *G01S 17/06* | (2006.01) |
| *G01S 17/42* | (2006.01) |
| *G01S 17/66* | (2006.01) |

(52) U.S. Cl.
CPC ............... *G01B 11/25* (2013.01); *G01S 17/06* (2013.01); *G01S 17/42* (2013.01); *G01S 17/66* (2013.01)
USPC .......................................... 356/603; 356/601

(58) Field of Classification Search
CPC ......... G01B 11/25; G01S 17/42; G01S 17/06; G01S 17/66
USPC ........... 356/601–625; 345/163, 173, 157–158
See application file for complete search history.

(56) References Cited

U.S. PATENT DOCUMENTS

| | | |
|---|---|---|
| 4,733,609 A | 3/1988 | Goodwin et al. |
| 4,824,251 A | 4/1989 | Slotwinski et al. |
| 4,830,486 A | 5/1989 | Goodwin |
| 4,969,736 A | 11/1990 | Slotwinski |
| 5,114,226 A | 5/1992 | Goodwin |
| 5,719,622 A * | 2/1998 | Conway ..................... 348/211.8 |
| 6,292,263 B1 | 9/2001 | Norita |

(Continued)

FOREIGN PATENT DOCUMENTS

| | | |
|---|---|---|
| GB | 2472514 A | 2/2011 |
| JP | 2664399 A | 2/1999 |

OTHER PUBLICATIONS

U.S. Appl. No. 13/922,867, entitled "Measurement Assembly With Fiber Optic Array", filed Jun. 20, 2013 and its entire prosecution history.

(Continued)

*Primary Examiner* — Sang Nguyen
(74) *Attorney, Agent, or Firm* — Roeder & Broder LLP (57) ABSTRACT

A measurement assembly (12) for measuring a feature (14A) on a surface (16) includes a metrology system (18), a mover assembly (19), a pointer (22), and a control system (24). The metrology system (18) generates a measurement beam (26), and the mover assembly (19) selectively adjusts the direction of the measurement beam (26). The pointer (22) is handheld and generates a pointer beam (34) that can be selectively directed at the surface (16) to form a pointer spot (36) on the surface (16). Further, the control system (24) controls the mover assembly (19) to move the direction of the measurement beam (26) until the measurement beam (26) is approximately directed at the pointer spot (36).

31 Claims, 7 Drawing Sheets

(56) References Cited

U.S. PATENT DOCUMENTS

| | | | |
|---|---|---|---|
| 6,295,051 B1* | 9/2001 | Kanevsky et al. | 345/163 |
| 6,944,564 B2 | 9/2005 | De Jonge et al. | |
| 7,009,717 B2 | 3/2006 | Van Coppenolle et al. | |
| 7,139,446 B2 | 11/2006 | Slotwinski | |
| 7,268,892 B2 | 9/2007 | Van Den Bossche | |
| 7,280,226 B2 | 10/2007 | Van Den Bossche | |
| 7,299,145 B2 | 11/2007 | De Jonge et al. | |
| 7,428,061 B2 | 9/2008 | Coppenolle et al. | |
| 7,463,368 B2 | 12/2008 | Morden et al. | |
| 7,545,517 B2 | 6/2009 | Rueb et al. | |
| 7,826,069 B2 | 11/2010 | Rueb et al. | |
| 7,925,134 B2 | 4/2011 | Slotwinski et al. | |
| 8,353,059 B2 | 1/2013 | Crampton et al. | |
| 2002/0027652 A1* | 3/2002 | Paromtchik et al. | 356/141.1 |
| 2004/0085522 A1* | 5/2004 | Honig et al. | 353/121 |
| 2005/0278098 A1 | 12/2005 | Breed | |
| 2006/0192946 A1* | 8/2006 | Walser | 356/144 |
| 2006/0222314 A1 | 10/2006 | Zumbrunn et al. | |
| 2007/0043526 A1 | 2/2007 | De Jonge et al. | |
| 2007/0291282 A1 | 12/2007 | Van Den Bossche | |
| 2008/0030461 A1* | 2/2008 | Matsui et al. | 345/156 |
| 2008/0309949 A1 | 12/2008 | Rueb | |
| 2009/0091532 A1* | 4/2009 | Hockett | 345/158 |
| 2009/0097039 A1* | 4/2009 | Kawasaki et al. | 356/603 |
| 2009/0105986 A1* | 4/2009 | Staab et al. | 702/151 |
| 2009/0205088 A1 | 8/2009 | Crampton et al. | |
| 2009/0257069 A1 | 10/2009 | Rueb et al. | |
| 2009/0323077 A1 | 12/2009 | Slotwinski et al. | |
| 2010/0260320 A1* | 10/2010 | Gertner | 378/65 |
| 2010/0275454 A1* | 11/2010 | Tippett et al. | 33/228 |
| 2010/0277747 A1 | 11/2010 | Rueb et al. | |
| 2012/0026510 A1 | 2/2012 | Crampton et al. | |
| 2013/0060134 A1* | 3/2013 | Eshima et al. | 600/431 |

OTHER PUBLICATIONS

The International Search Report and the Written Opinion of the International Searching Authority for PCT/JP13/67014, Nikon Corporation, Aug. 16, 2013. (related application).

* cited by examiner

MEASUREMENT ASSEMBLY INCLUDING A METROLOGY SYSTEM AND A POINTER THAT DIRECTS THE METROLOGY SYSTEM

RELATED INVENTION

This application claims priority on U.S. Provisional Application Ser. No. 61/659,885, filed Jun. 14, 2012 and entitled "LASER POINTER TO DIRECT LASER METROLOGY MEASURING SYSTEM". As far as permitted, the contents of U.S. Provisional Application Ser. No. 61/659,885 are incorporated herein by reference.

BACKGROUND

Metrology systems such as laser metrology systems can be utilized for various purposes. For example, laser metrology systems can be utilized for precise dimensional measurement and/or verification for manufactured parts. As manufactured parts get smaller and smaller, and also include more intricate details, the need for improved measurement systems increases.

Unfortunately, currently available metrology systems are not entirely satisfactory. For example, in certain metrology systems, it is necessary for an operator to identify and select a feature to be measured on a video user interface screen. In such systems, the selection may involve centering the feature on the screen and pressing a button, or perhaps, when using a touch screen, just touching the screen at the location where the feature appears. However, this selection process may be somewhat slow because the metrology system must be driven to show or indicate the feature to be measured. Further, the selection process may further include zooming the camera to be sure the correct feature is selected.

SUMMARY

The present invention is directed toward a measurement assembly for measuring a feature on a surface. In one embodiment, the measurement system includes a metrology system, a mover assembly, a pointer, and a control system. The metrology system generates a measurement beam, and the mover assembly selectively moves at least a portion of the metrology system and a direction of the measurement beam. The pointer generates a pointer beam that can be selectively positioned to identify the feature. For example, the pointer beam directed at the surface forms a pointer spot on the surface that can be used to identify the feature. Alternatively, pointer beam can be moved in a predetermined path to identify the feature. In certain embodiments, the pointer is a hand-held device that is easy to handle and maneuver.

Moreover, the control system controls the mover assembly to move the direction of the measurement beam until the measurement beam is approximately directed at the identified feature. For example, the control system can control the mover assembly to move the direction of the measurement beam until the measurement beam is approximately directed at the pointer spot.

With these designs, the pointer can be used to quickly and easily indicate one or more features that are to be measured. As a result thereof, the slow and inconvenient process of moving a metrology system to select a feature to be measured is overcome by using the pointer.

In one embodiment, the control system controls the mover assembly to move the direction of the measurement beam so that the measurement beam approximately follows the pointer spot on the surface. With this design, the pointer can be used to quickly and easily indicate and identify subsequent features to be measured. Stated in another fashion, the pointer spot can be moved from feature to feature, while the metrology system is controlled to automatically follow or track the pointer spot from feature to feature.

Additionally, the measurement system can include a feedback device that provides feedback information to the control system to determine the relative location of the pointer spot. Further, in this embodiment, the control system can use the feedback information to determine how much movement is required for the measurement beam to be directed at the pointer spot. In one embodiment, the feedback device is an image apparatus (e.g. a camera) having a field of view. In this embodiment, the camera can provide feedback information to the control system to detect when the pointer spot is within the field of view. Further, in this embodiment, the control system can use the feedback information to determine how much movement is required for the measurement beam to be directed at the pointer spot.

In yet another embodiment, the invention is directed to a method comprising the steps of: (i) generating a measurement beam with a metrology system; (ii) selectively moving a direction of the measurement beam with a mover assembly; (iii) directing a pointer beam from a pointer at the surface to form a pointer spot on the surface; and (iv) controlling the mover assembly with a control system to move the direction of the measurement beam until the measurement beam is approximately directed at the pointer spot.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which.

DESCRIPTION

Figure 1:
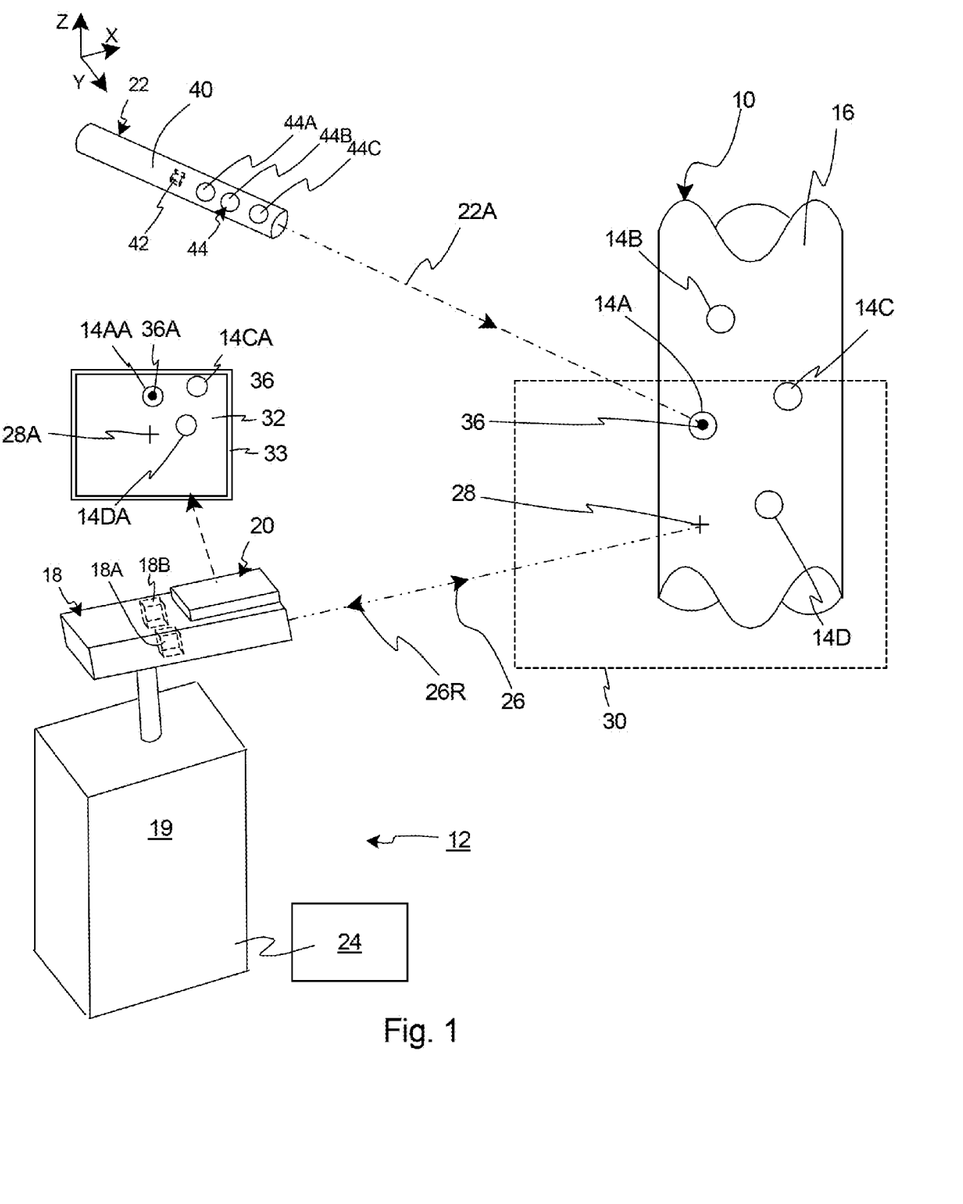
FIG. 1 is a simplified schematic illustration of an object and an embodiment of a measurement assembly having features of the present invention with a measurement beam pointed at a first location and a pointer beam at a first feature.

FIG. 1 is a simplified schematic illustration of an object 10, and a first embodiment of a measurement assembly 12 that can be used to measure one or more features 14A, 14B, 14C, 14D (four such features are specifically illustrated in FIG. 1) that are present on a surface 16 of the object 10. In one embodiment, the measurement assembly 12 can be used to accurately measure the size and/or the location (e.g. the X-Y-Z coordinates), of the one or more features 14A-14D on the surface 16 of the object 10, or the location or orientation of the object 10.

The design of the components of the measurement assembly 12 can be varied depending on the desired usages for the measurement assembly 12. In FIG. 1, the measurement assembly 12 includes a metrology system 18 that generates a measurement beam 26, a mover assembly 19 that moves the measurement beam 26, a feedback device 20, a pointer 22 that generates a pointer beam 22A, and a control system 24. As provided herein, the pointer 22 can be manipulated to direct the pointer beam 22A at the surface 16 to generate a pointer spot 36 on the surface 16. Moreover, the control system 24 controls the mover assembly 19 to move the direction of the measurement beam 26 until the measurement beam 26 is approximately directed at the pointer spot 36. With this design, the pointer 22 can be used to quickly, accurately, and easily indicate (identify) one or more features 14A-14D that are to be measured. As a result thereof, the measurement system 12 can quickly and accurately measure the features 14A-14D, and quickly move between features 14A-14D. Further, the slow and inconvenient process of moving the metrology system 18 to select the features 14A-14D to be measured is overcome by using the pointer 22.

Some of the Figures provided herein include an orientation system that designates an X axis, a Y axis, and a Z axis. It should be understood that the orientation system is merely for reference and can be varied. Moreover, these axes can alternatively be referred to as a first, second, or third axis.

The type of object 10 and/or the features 14A-14D on the object 10 being measured can vary. For example, the features 14A-14D can be holes, edges, surfaces, balls, protrusions, wires, or other things. As a non-exclusive example, the object 10 can be a manufacture part, a natural object, or assembly having one or more features 14A-14D that require measuring to evaluate a quality of the object 10. Alternatively, for example, the object 10 can be a part or assembly that is monitored during a manufacturing or assembly process. The scale of the measuring, manufacturing or assembly process can be small (e.g. one millimeter) or large (e.g. tens of meters).

It should be noted that the illustration of the one or more features 14A-14D as small circles in FIG. 1 is merely for purposes of demonstration, and the features 14A-14D can have any size and shape on the surface 16.

In FIG. 1, the object 10 is illustrated as being free in space. However, for example, the object 10 can be retained by an automated moving device (not shown) that retains, manipulates, and moves the object 10 during the measurement and/or assembly process.

In one embodiment, the metrology system 18 is a laser-based metrology system that accurately measures the size and/or the location of the features 14A-14D on the surface 16 of the object 10. Alternatively, the metrology system 18 can have a different design and/or the metrology system 18 can be used for other suitable purposes.

In one embodiment, the metrology system 18 includes a laser source 18A (illustrated as a box in phantom) that generates the measurement beam 26 that can be directed at the surface 16 of the object 10. In one embodiment, the measurement beam 26 has a wavelength that is in the infrared range. As non-exclusive examples, the measurement beam 26 can have a wavelength of between approximately 750 nm and two micrometers. Alternatively, the measurement beam 26 can include a wavelength that is outside the infrared range, such as the visible or ultraviolet range.

It should be noted that in FIG. 1, the place where the measurement beam 26 presently impinges on the surface 16 can be referred to as a measurement point 28 (represented with a small plus sign). In FIG. 1, at this time, the measurement beam 26 is pointed at a first location on the surface 16 and not one of the features.

In certain embodiments, the measurement beam 26 directed at the surface 16 can be reflected and/or scattered back toward the metrology system 12 from the surface 16 as a returning beam 26R. In this embodiment, the metrology system 18 can include a detector 18B (illustrated as a box in phantom) that receives and detects the reflected beam 26R, and that provides a measurement signal to the control system 24 that relates to the reflected beam 26R and the measurement point 28. In one embodiment, the reflected beam 26R is interfered with a reference beam (not shown) to generate the measurement signal.

Examples of suitable metrology systems 18 are disclosed in U.S. Pat. Nos. 4,733,609; 4,824,251; 4,830,486; 4,969,736; 5,114,226; 7,139,446; 7,925,134; and Japanese Patent No. 2,664,399 which are incorporated by reference herein. Another non-exclusive example of a suitable metrology system 18 is a laser tracker as disclosed in US published application US2006-0222314 (which is incorporated by reference herein).

The mover assembly 19 selectively moves and positions at least a portion of the metrology system 18 and to selectively adjust (steer) the direction of the measurement beam 26. With this design, the mover assembly 19 can selectively move the metrology system 18 so that the measurement beam 26 is directed at the desired location (e.g. feature 14A-14D) to be measured. As a non-exclusive example, the mover assembly 19 can sequentially move the metrology system 18 so that the measurement beam 26 (i) points at the first feature 14A to measure the first feature 14A, (ii) points at the second feature 14B to measure the second feature 14B, (iii) points at the third feature 14C to measure the third feature 14C, and (iv) points at the fourth feature 14D to measure the fourth feature 14D.

In one embodiment, the mover assembly 19 selectively moves the metrology system 18 about two axes, namely about the Y axis and about the Z axis. Alternatively, the mover assembly 19 can be designed to the move a portion of metrology system 18 with greater than two or less than two rotational degrees of freedom, and/or can provide translational adjustments to the position of the metrology system 18.

The mover assembly 19 can include one or more rotary actuators, linear actuators, or other types of actuators. The mover assembly 19 can be controlled by the control system 24.

The feedback device 20 provides feedback information that is used by the control system 24 to determine the relative location of the measurement point 28 and/or the pointer spot 36. Further, in this embodiment, the control system 24 can use the feedback information to determine how much movement is required for the measurement beam 26 to be directed at the pointer spot 36, and/or how much movement is required so that the measurement beam 26 continues to be directed at the pointer spot 36 even when the pointer 22 is being moved.

In one embodiment, the feedback device 20 is an image apparatus (e.g. a camera) having a field of view 30 (illustrated as a rectangular box). The field of view 30 is also sometimes referred to as a detectable area. In this embodiment, the camera 20 can provide feedback information to the control system 24 when the pointer spot 36 is within the field of view 30. In certain embodiments, the camera includes an image sensor that is sensitive to the wavelengths of the measurement beam 26 and the pointer beam 22A. Suitable sensors include a charge coupled device or a complementary metal oxide semiconductor.

In one embodiment, the optics of the camera 20 are aligned so that the field of view 30 always surrounds where the measurement beam 26 impinges on the surface 16. With the present design, the control system 24 can use the feedback information to identify the position of the measurement point 28, and the position of the pointer spot 36 when the pointer spot 36 is within the field of view 30 of the camera 20.

In certain embodiments, the feedback device 20 also continuously generates an image 32 of its field of view 30 that is displayed on a video screen 33 (illustrated away from the feedback device 20). The video screen 33 can be used by a user as a video user interface to manually input information to control the mover assembly 19.

In FIG. 1, the image 32 illustrates that a measurement point image 28A is spaced apart from the pointer spot image 36A. With the feedback information, the control system 24 can control the mover assembly 19 to move the measurement beam 28 in a closed loop fashion until the measurement beam 28 is pointed at the pointed spot 36 on the surface 16. Further, in FIG. 1, the feature images 14AA, 14CA, 14DA are also in the captured image 32.

Additionally, in certain embodiments, the mover assembly 19 concurrently moves the feedback device 20 with the measurement beam 26. In FIG. 1, the feedback device 20 is fixedly secured to and moves with the metrology system 18.

The pointer 22 generates the pointer beam 22A that can be directed at the surface 16 to generate the pointer spot 36. In certain embodiments, the pointer 22 is handheld and can be manually manipulated with a hand of a person to direct the pointer beam 22A at the surface 16 to create the pointer spot 36 that is bright and visible to the naked eye. Alternatively, the pointer 22 can be mounted on a pointer base (not illustrated) and/or the pointer 22 can be controlled in other than a handheld manner.

The design of the pointer 22 can be varied to suit the specific design requirements of the measurement assembly 12 and/or the metrology system 18. In FIG. 1, the pointer 22 is a laser pointer that includes a pointer housing 40, a pointer laser source 42 (illustrated as a box in phantom), and one or more control switches 44.

In certain embodiments, the pointer laser source 42 generates the pointer beam 22A that is in the visible wavelength range. As a non-exclusive example, the pointer beam 22A can have a wavelength in the range of approximately six hundred nanometers and six hundred and sixty nanometers. Additionally, the specifications for a laser pointer 22 should be in the proper scope of application of the country within which it will be used. For example, in Japan, the laser pointer 22 must be limited to have a maximum power of one mW (class 2), as a laser pointer having a maximum power over one mW is prohibited per Japanese law.

The control switches 44 allow for the control of the pointer 22 and the control system 24. For example, one or more of the control switches 44 can include (i) an on/off power button 44A, (ii) an indicator switch 44B that can be used to indicate to the control system 24 when the pointer beam 22A is pointed at the desired feature on the surface 16 to be measured, and/or (iii) a follow switch 44C that indicates to the control system 24 that the mover assembly 19 should be controlled so that the measurement beam 26 follows (tracks) the pointer spot 36.

It should be noted that in FIG. 1, the pointer spot 36 is controlled by the user (not shown) to be directed at the first feature 14A. Additionally, it should also be noted that in FIG. 1, the pointer spot 36 is illustrated as a small dot. Alternatively, the pointer spot 36 can have a different size and shape.

Additionally, in certain embodiments, the pointer beam 34 is encrypted in such a way as to make the pointer spot 36 on the surface 16 uniquely recognizable by the control system 24. In one embodiment, the pointer beam 34 can be pulsed so that it is easily identified by the camera 20. For example, the pointer beam 34 can be pulsed at a rate that is approximately one-half the frame rate of the camera 20. If the frame rate of the camera 20 is approximately thirty frames per second (progressive scan type), the pointer beam 34 can be pulsed at approximately fifteen frames per second. In this example, every other image 32 of the camera 20 will contain the pointer spot 36, and the electronics of the control system 24 can be programmed to recognize this timing pattern. Alternatively, the pointer beam 34 of the pointer 22 can be encrypted in another suitable manner.

The control system 24 controls the operation of the various components in the measurement assembly 12. The control system 24 can include one or more electronic processors and circuits.

In one embodiment, the control system 24 is in electrical communication with the pointer 22, the metrology system 18, the mover assembly 19, and the feedback device 20. As non-exclusive examples, the pointer 22 can be in communication with the control system 24 via radio frequency (RF), infrared (IR), or by direct wire connection. In yet another embodiment, the pointer 22 can adjust pulse rate of the pointer beam 22A to communicate with the control system 24. In this embodiment, for example, when the indicator button 44B is activated, the pulsing of the pointer beam 22A can be changed to indicate that the pointer beam 22A is highlighting the feature 14A ("the indicated feature") that is to be measured. For example, continuing from the previous example (frame rate approximately thirty frames per second and pulse rate of approximately fifteen frames per second), upon activation of the indicator button 44B, the pulse rate of the pointer beam 22A can changed to flash at approximately ten frames per second, thus signaling a desired measurement point.

As provided herein, in certain embodiments, the control system 24 receives information from the camera 20 and determines the relative position between the indicated feature 14A (e.g. the location of the pointer spot 36) and the measurement point 28. Moreover, the control system 24 controls the mover assembly 19 to move the direction of the measurement beam 26 until the measurement beam 26 is approximately directed at the indicated feature 14A (e.g. the pointer spot 36). Further, the control system 24 can control the mover assembly 19 to move the direction of the measurement beam 26 so that the measurement beam 26 approximately follows the pointer spot 36 on the surface 16. With this design, the control system 24 can be utilized to ensure the effective and continuous alignment between the measurement beam 26 on the pointer spot 36.

In the example illustrated in FIG. 1, it is desired to measure the first feature 14A. At the time illustrated in FIG. 1, the pointer beam 22A is directed at the first feature 14A and the measurement beam 26 is not. With the present invention, the indicator button 44B can be activated to indicate to the control system 24 to control the mover assembly 19 to appropriately move the measurement beam 26.

Alternatively, other suitable methods may be utilized to indicate the features 14A-14D that are desired to be measured. One non-exclusive alternative method includes moving the pointer beam 22A (and the pointer spot 36) in a predetermined path to identify the feature 14A to be measured. For example, during use, the operator can move the pointer 22 and the pointer beam 22A so that the pointer spot 36 traces an "X" that crosses the feature 14A-14D to identify the feature 14A-14D to be measured. In this example, the predetermined path is an "X". The electronics of the measurement assembly 12, e.g., the control system 24, would be programmed such that the "X" generated on the surface 16 of the manufactured part 10 would be recognized as an indication of the features 14A-14D to be measured, e.g., at the center of the "X".

Alternatively, if the predetermined path is a circle, the operator can move the pointer 22 and the pointer beam 22A so that the pointer spot 36 traces an "O" that encircles the feature 14A-14D to identify the feature 14A-14D to be measured. In this example, the electronics of the measurement assembly 12, e.g., the control system 24, would be programmed such that the "O" generated on the surface 16 of the manufactured part 10 would be recognized as an indication of the features 14A-14D to be measured, e.g., at the center of the "O". With this design, for example, if the feature 14A-14D comprises a hole that is to be measured, the pointer 22, and thus the pointer beam 22A, can be moved so that the pointer spot 36 from the pointer beam 22A traces a circle around the hole, indicating a hole feature that is to be measured inside of the traced out circle. This form of indication will work to identify features in which the pointer spot 36 may not be visible. More specifically, the pointer spot 36 may not be visible when directly pointing at a hole. Thus, the hole can be identified by tracing the outline of a circle around the hole.

It should be noted that the predetermined path can have other shapes than the examples provided herein. For example, the predetermined path can be generally rectangular shaped.

Further, if the features 14A-14D to be measured are distinctive, such as a hole or an edge, the metrology system 18 can accurately refine the location of the features 14A-14D by scanning using the measurement beam 26.

With the present design, in practice, the operator would move the pointer 22 so that the pointer spot 36 is moved from feature to feature to accurately indicate the specific features 14A-14D. In some embodiments, the metrology system 18 can be programmed to recognize the indicated features 14A-14D as approximate only. Subsequently, after all the features 14A-14D are appropriately indicated using the pointer 22, the metrology system 18 can be used to determine the exact location of the features 14A-14D one by one automatically.

With the present invention, the ease of set up of the measurement assembly 12 and the metrology system 18 can be greatly enhanced, and the set up time can be much quicker than is possible with other currently available metrology systems. Accordingly, the measurement assembly 12 enables the features 14A-14D on the object 10 to be quickly and accurately measured without unnecessary delays.

Figure 2:
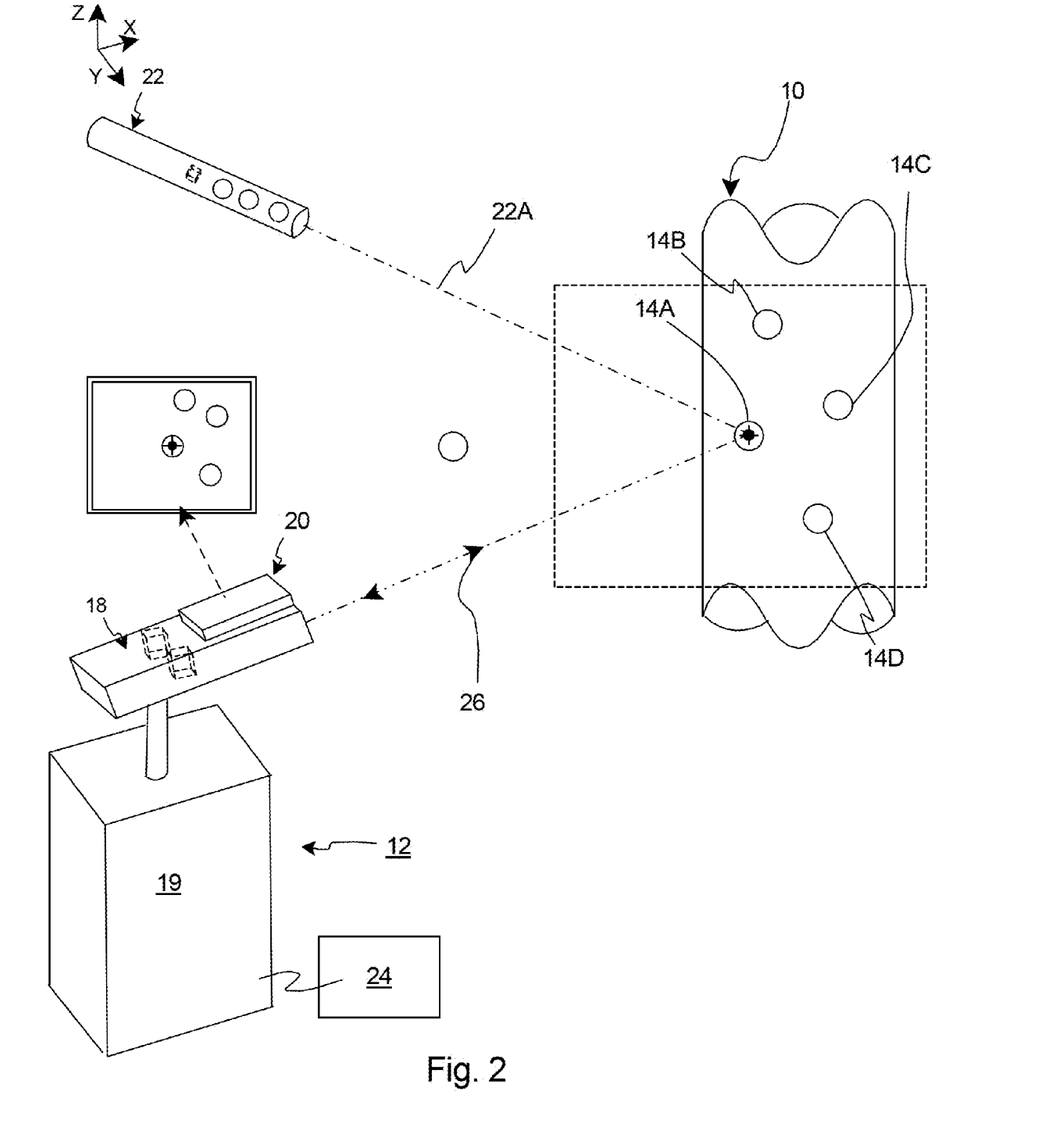
FIG. 2 is a simplified schematic illustration of the object and the measurement assembly of FIG. 1 with the measurement beam and the pointer beam pointed at the first feature.

FIG. 2 is a simplified schematic illustration of the object 10 including the features 14A, 14B, 14C, 14D, and the measurement assembly 12 of FIG. 1 including the metrology system 18, the mover assembly 19, the feedback device 20, the pointer 22, and the control system 24. In comparing FIGS. 1 and 2, the mover assembly 19 has moved the measurement beam 26 so that the measurement beam 26 is directed at the first feature 14A, along with the pointer beam 22A. At this time, the measurement beam 26 is aligned on the first feature 14A with the pointer beam 22A, and the metrology system 18 can be used to take the desired measurements of the first feature 14A.

Figure 3:
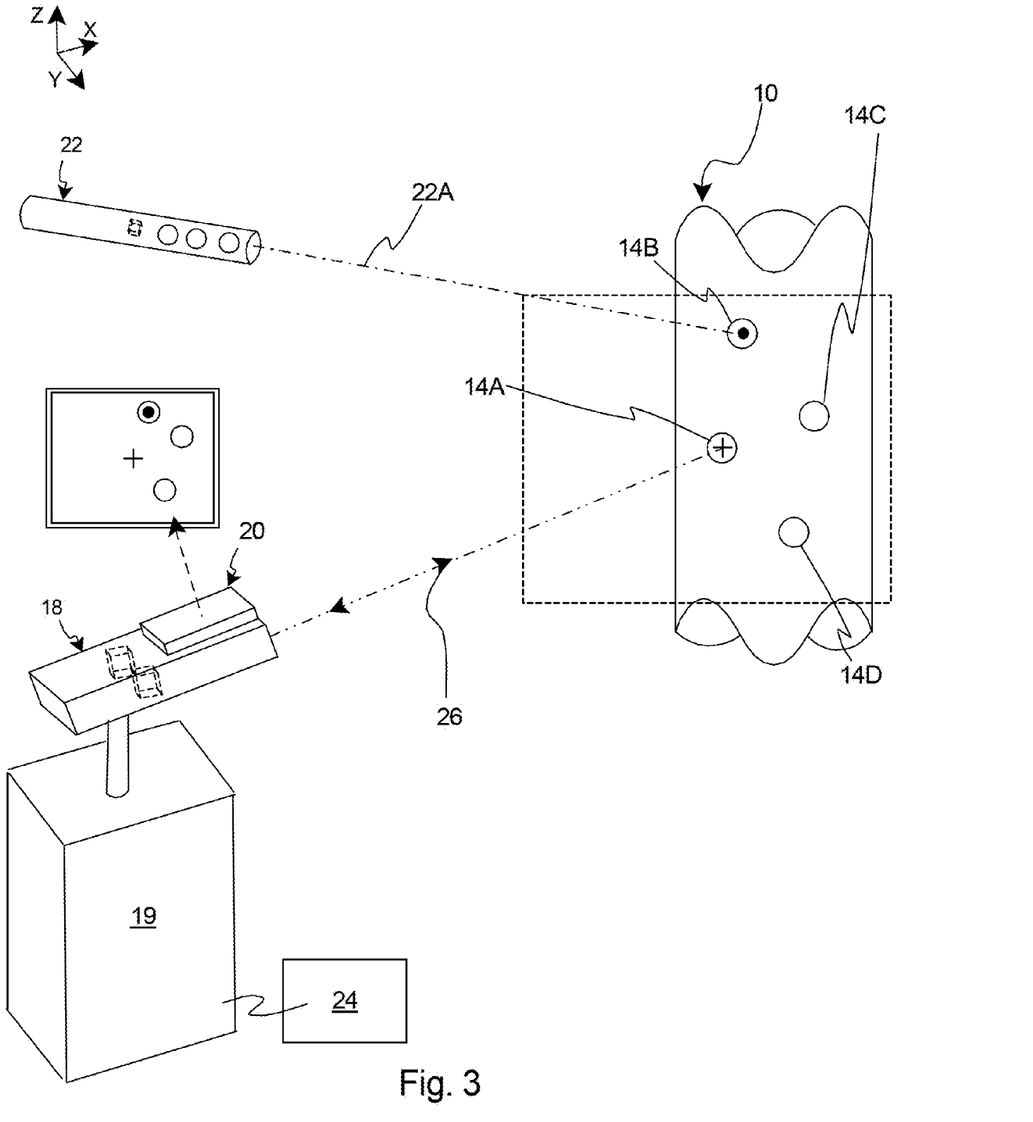
FIG. 3 is a simplified schematic illustration of the object and the measurement assembly of FIG. 1 with the measurement beam pointed at the first feature, and the pointer beam pointed at a second feature.

FIG. 3 is a simplified schematic illustration of the object 10 including the features 14A, 14B, 14C, 14D, and the measurement assembly 12 of FIG. 1 including the metrology system 18, the mover assembly 19, the feedback device 20, the pointer 22, and the control system 24. In comparing FIGS. 2 and 3, the pointer beam 22A has been moved to point at the second feature 14B while the metrology system 18 is making the desired measurements of the first feature 14A. At this time, the user, via the pointer 22 can indicate to the control system 24 to control the mover assembly 19 to move the measurement beam 26 so that it is directed at the second feature 14B.

Figure 4:
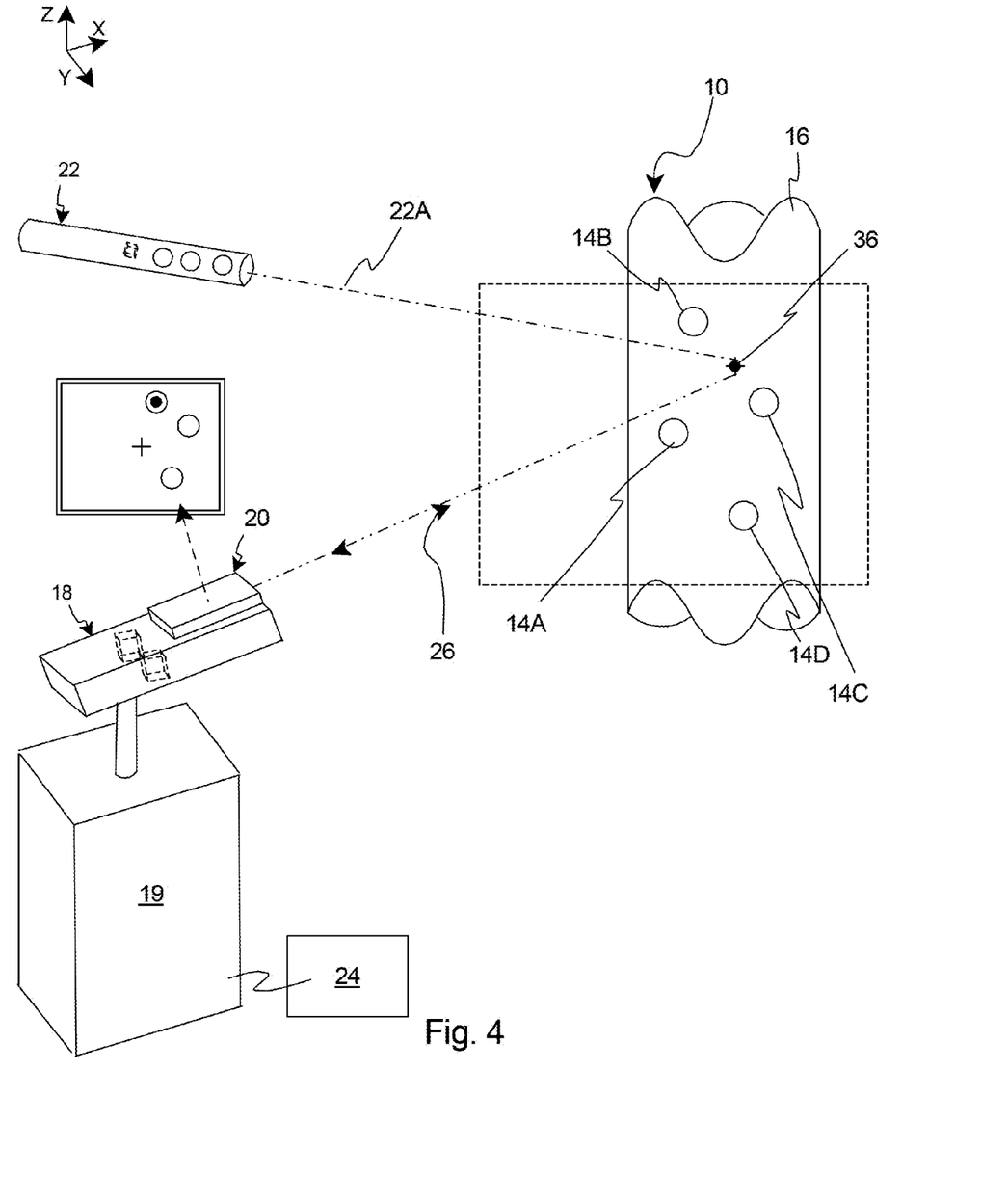
FIG. 4 is a simplified schematic illustration of the object and the measurement assembly of FIG. 1 with the measurement beam being moved to follow the pointer beam.

FIG. 4 is a simplified schematic illustration of the object 10 including the features 14A, 14B, 14C, 14D, and the measurement assembly 12 of FIG. 1 including the metrology system 18, the mover assembly 19, the feedback device 20, the pointer 22, and the control system 24. At this time, the control system 24 is controlling the mover assembly 19 to move the measurement beam 26 to track the movement of the pointer beam 22A on the surface 16 from the second feature 14B to the third feature 14C. Stated in another fashion, when the measurement beam 26 and the pointer spot 36 are aligned, the metrology system 18 is adjustable so that the measurement beam 26 continuously follows the pointer spot 36 on the surface 16.

Once the pointer 22 is pointing to the desired feature 14A-14D, the user can indicate to the control system 24 via the pointer 22 that the metrology system 18 should take the desired measurements.

Furthermore, the shape of spot 36 in the above embodiments is not limited to a circle spot, but can also be, for example a star shape, line shape, a square or another shape. The feedback device 20 may detect the position of the spot 36 by the pointer 22 by recognizing the shape.

Additionally, the feedback device 20 (e.g. a camera) can be designed to include a filter. The filter can be designed to block undesirable wavelengths of light, while transmitting light at approximately wavelength of the pointer beam 22A.

Furthermore, the wavelength of pointer beam 22A is not limited to a fixed wavelength, but can also be, for example changeable wavelength. For example. the wavelength of pointer beam 22A can be changed based on the color of the surface 16 of irradiated pointer beam 22A. More specifically, the wavelength of pointer beam 22A can be changed, when the accuracy of the determination for the pointer spot 36 of pointer beam 22A by feedback device 20 is decreased, for example due to the similarity between the wavelength of the pointer beam 22A and the color of the surface 16.

Moreover, the feedback device 20 (e.g. a camera) can include a shutter. The shutter may be used to control the exposure time. The shutter may control the amount of the exposure value, when the exposure value of the pointer beam 22A may be high with predetermined shutter speed.

Furthermore, the present invention can also be adapted to a metrology system that measures a distance between the metrology system and a target, e.g. a corner cube, a sphere, or another reference. One non-exclusive example of a suitable metrology system 18 is a laser tracker as disclosed in US published application US 2006-0222314 (which is incorporated by reference herein).

Additionally, the present invention is not limited to use by a human. For example, in another, non-exclusive embodiment, the pointer 22 can be manipulated and controlled by a human type of robot, e.g. a robot arm.

Furthermore, the pointer 22 can be modified to include a stabilization function that reduces the influence of vibration of the pointer 22 by the user on the location of the pointer spot 36 on the surface 16.

Figure 5:
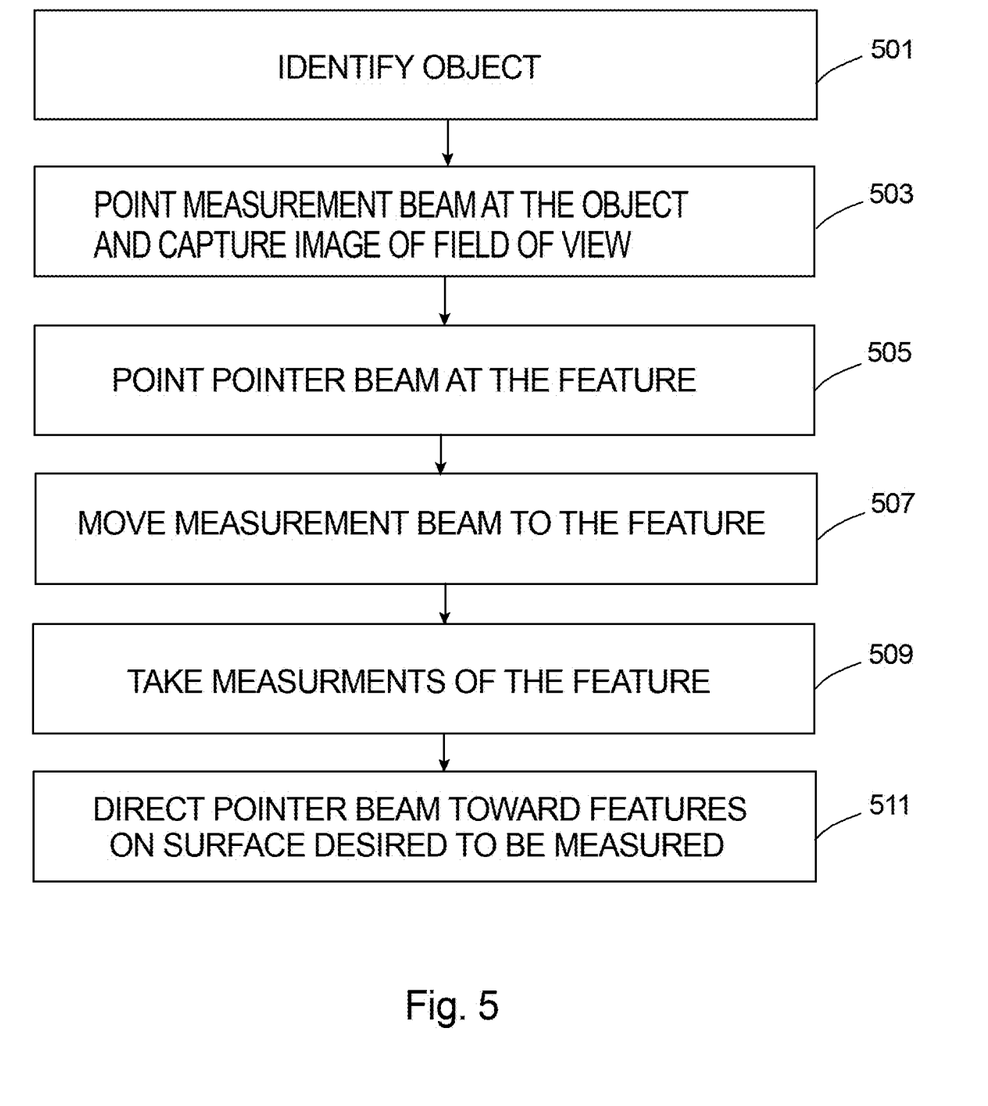
FIG. 5 is a flow chart that illustrates one example of a use of the measurement assembly of FIGS. 1-3.

FIG. 5 is a flow chart that illustrates one example of a use of the measurement assembly 12 provided herein. More specifically, FIG. 5 outlines one example of the use of the measurement assembly 12. It should be noted that although the steps provided herein are included in a specific order, such listing of the steps is not intended to be limiting in any manner. For example, certain steps can be combined or eliminated, or the steps can be performed in a different order than discussed herein, without altering the intended breadth or scope of the present invention.

Initially, at step 501, the object is identified or selected, which includes one or more features that are desired to be measured.

At step 503, the measurement beam is pointed at the object, and the camera captures images of the object. The camera can change the area of the field of view.

At step 505, the user can manipulate the pointer to direct the pointer beam at the first feature desired to be measured. Stated in another fashion, the user can manually move the pointer to manually direct the pointer beam at the first feature desired to be measured. The pointer directs the pointer beam at the first feature desired to be measured by the instruction of the user, e.g. the movement of the arm of the user.

At step 507, the user, via the pointer, can indicate to the control system to move the measurement beam to align on the pointer spot. Subsequently, the control system automatically controls the movement of the direction of the measurement beam. In certain embodiments, the control system controls the direction of the measurement beam such that the measurement beam is moved without instructions from the user. The present invention may also adapt several times to the movement beam to align on the pointer spot. For example, one is rough align, after rough align, the other align is fine align. The movement length can be different between the rough align and fine align. The field of view of the camera may also be different between the rough align and fine align. In certain embodiments, the field of view of camera for rough align is wider than that of camera for fine align.

At step 509, after the measurement beam is aligned on the feature, the measurement beam can take measurements on the feature.

At step 511, next, the user, via the pointer can instruct the control system to move the measurement beams to follow the pointer spot to subsequent features.

Next, explanations will be made with respect to a structure manufacturing system provided with the measuring apparatus (metrology system 18) described hereinabove.

Figure 6:
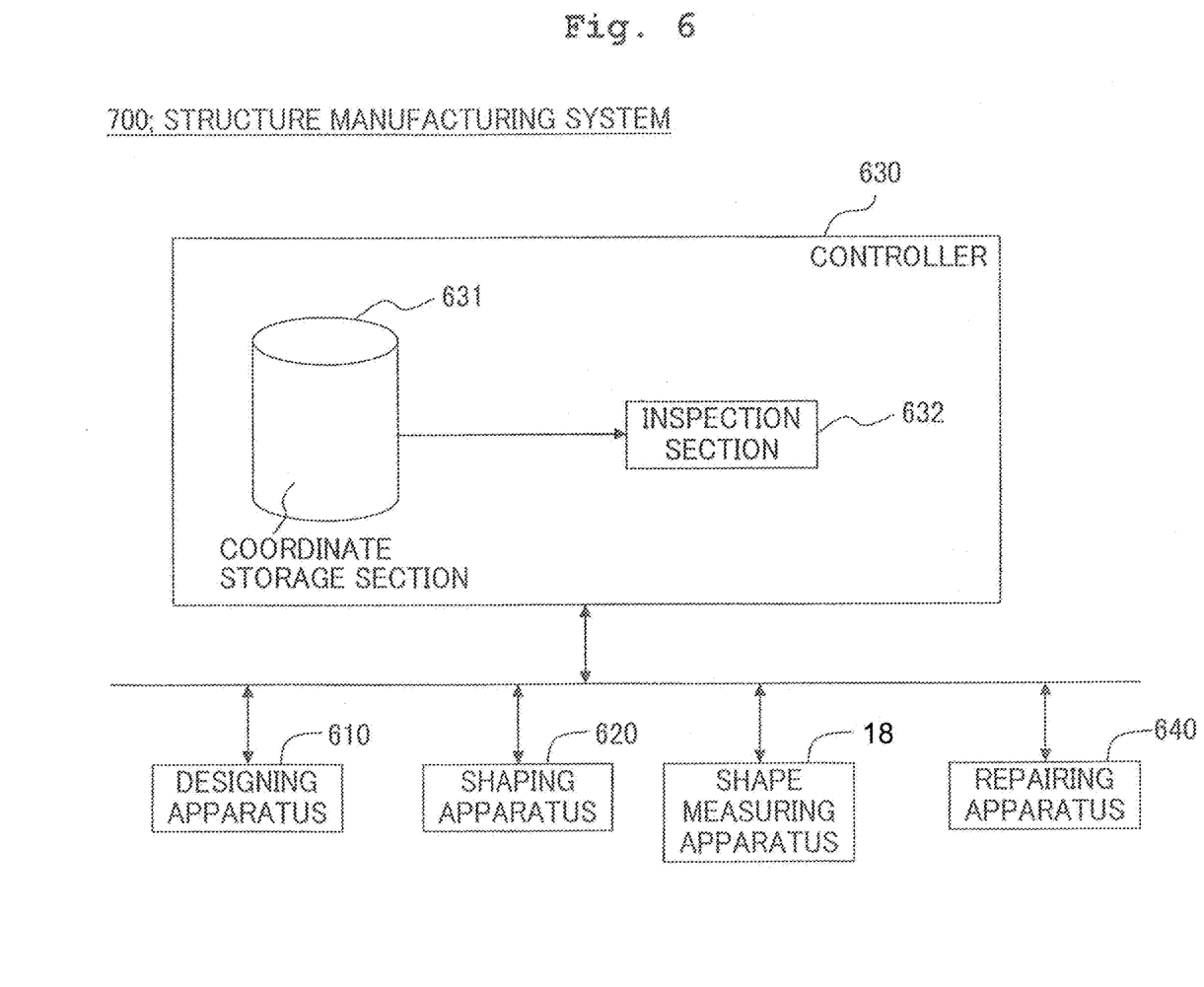
FIG. 6 is a block diagram of a structure manufacturing system having features of the present invention.

FIG. 6 is a block diagram of a non-exclusive example of a structure manufacturing system 700. The structure manufacturing system is for producing at least a structure from at least one material such as a ship, airplane and so on, and inspecting the structure by the profile measuring apparatus 100. The structure manufacturing system 700 of the embodiment includes the profile measuring apparatus 100 as described hereinabove in the embodiment, a designing apparatus 610, a shaping apparatus 620, a controller 630 (inspection apparatus), and a repairing apparatus 640. The controller 630 includes a coordinate storage section 631 and an inspection section 632.

The designing apparatus 610 creates design information with respect to the shape of a structure and sends the created design information to the shaping apparatus 620. Further, the designing apparatus 610 causes the coordinate storage section 631 of the controller 630 to store the created design information. The design information includes information indicating the coordinates of each position of the structure.

The shaping apparatus 620 produces the structure based on the design information inputted from the designing apparatus 610. The shaping process by the shaping apparatus 620 includes such as casting, forging, cutting, and the like. The profile measuring apparatus 18 measures the coordinates of the produced structure (measuring object) and sends the information indicating the measured coordinates (shape information) to the controller 630.

The coordinate storage section 631 of the controller 630 stores the design information. The inspection section 632 of the controller 630 reads out the design information from the coordinate storage section 631. The inspection section 632 compares the information indicating the coordinates (shape information) received from the profile measuring apparatus 18 with the design information read out from the coordinate storage section 631. Based on the comparison result, the inspection section 632 determines whether or not the structure is shaped in accordance with the design information. In other words, the inspection section 632 determines whether or not the produced structure is nondefective. When the structure is not shaped in accordance with the design information, then the inspection section 632 determines whether or not the structure is repairable. If repairable, then the inspection section 632 calculates the defective portions and repairing amount based on the comparison result, and sends the information indicating the defective portions and the information indicating the repairing amount to the repairing apparatus 640.

The repairing apparatus 640 performs processing of the defective portions of the structure based on the information indicating the defective portions and the information indicating the repairing amount received from the controller 630.

Figure 7:
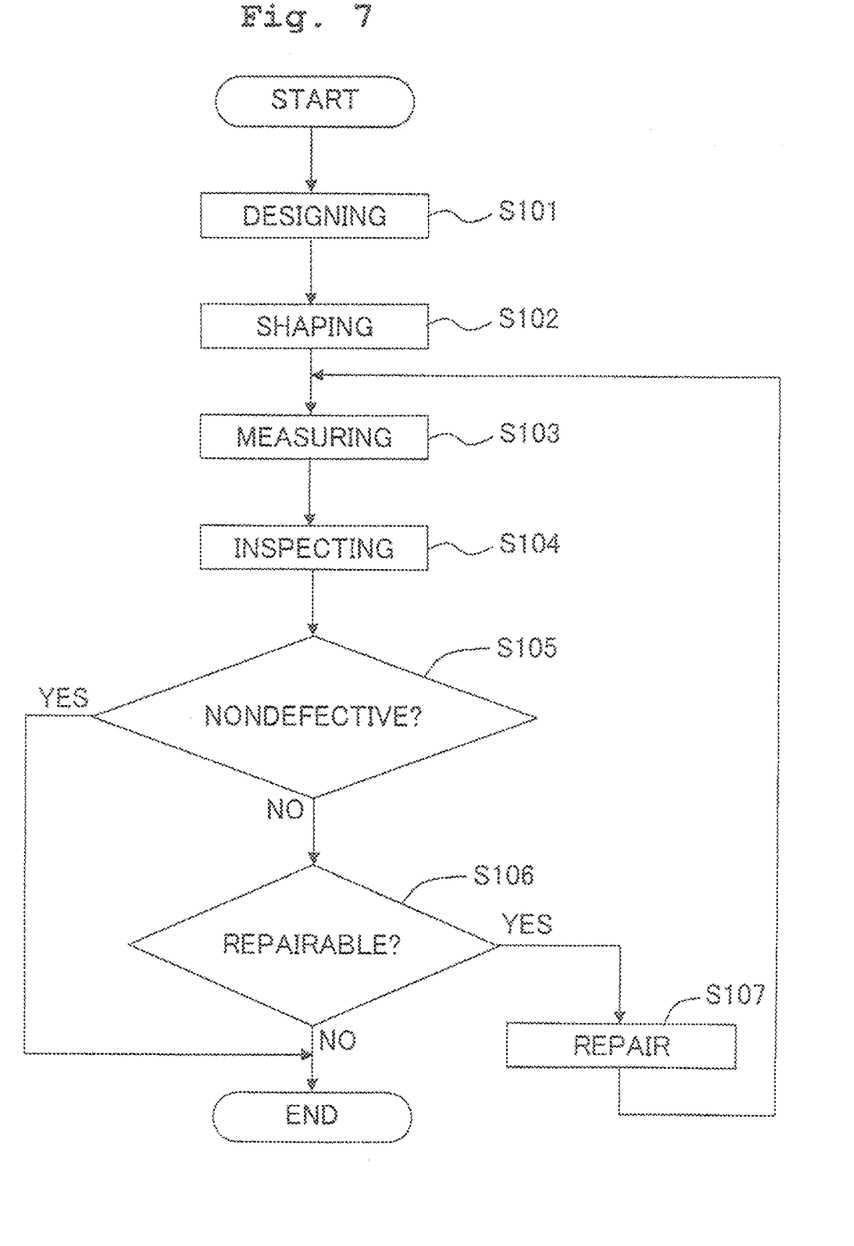
FIG. 7 is a flowchart showing a processing flow of the structure manufacturing system of FIG. 6.

FIG. 7 is a flowchart showing a processing flow of the structure manufacturing system 700. With respect to the structure manufacturing system 700, first, the designing apparatus 610 creates design information with respect to the shape of a structure (step S101). Next, the shaping apparatus 620 produces the structure based on the design information (step S102). Then, the profile measuring apparatus 18 measures the produced structure to obtain the shape information thereof (step S103). Then, the inspection section 632 of the controller 630 inspects whether or not the structure is produced truly in accordance with the design information by comparing the shape information obtained from the profile measuring apparatus 100 with the design information (step S104).

Then, the inspection portion 632 of the controller 630 determines whether or not the produced structure is nondefective (step S105). When the inspection section 632 has determined the produced structure to be nondefective ("YES" at step S105), then the structure manufacturing system 700 ends the process. On the other hand, when the inspection section 632 has determined the produced structure to be defective ("NO" at step S105), then it determines whether or not the produced structure is repairable (step S106).

When the inspection portion 632 has determined the produced structure to be repairable ("YES" at step S106), then the repair apparatus 640 carries out a reprocessing process on the structure (step S107), and the structure manufacturing system 700 returns the process to step S103. When the inspection portion 632 has determined the produced structure to be unrepairable ("NO" at step S106), then the structure manufacturing system 700 ends the process. With that, the structure manufacturing system 700 finishes the whole process shown by the flowchart of FIG. 7.

With respect to the structure manufacturing system 700 of the embodiment, because the profile measuring apparatus 18 in the embodiment can correctly measure the coordinates of the structure, it is possible to determine whether or not the produced structure is nondefective. Further, when the structure is defective, the structure manufacturing system 700 can carry out a reprocessing process on the structure to repair the same.

Further, the repairing process carried out by the repairing apparatus 640 in the embodiment may be replaced such as to let the shaping apparatus 620 carry out the shaping process over again. In such a case, when the inspection section 632 of the controller 630 has determined the structure to be repairable, then the shaping apparatus 620 carries out the shaping process (forging, cutting, and the like) over again. In particular for example, the shaping apparatus 620 carries out a cutting process on the portions of the structure which should have undergone cutting but have not. By virtue of this, it becomes possible for the structure manufacturing system 700 to produce the structure correctly.

In the above embodiment, the structure manufacturing system 700 includes the profile measuring apparatus 18, the designing apparatus 610, the shaping apparatus 620, the controller 630 (inspection apparatus), and the repairing apparatus 640. However, present teaching is not limited to this configuration. For example, a structure manufacturing system in accordance with the present invention can include fewer components than described herein.

While a number of exemplary aspects and embodiments of a measurement assembly 12 have been discussed above, those of skill in the art will recognize certain modifications, permutations, additions and sub-combinations thereof. It is therefore intended that the following appended claims and claims hereafter introduced are interpreted to include all such modifications, permutations, additions and sub-combinations as are within their true spirit and scope.

What is claimed is:

1. A measurement assembly for measuring a feature on a surface, the measurement assembly comprising:
    a metrology system that generates a measurement beam;
    a mover assembly that selectively moves at least a portion of the metrology system to move a direction of the measurement beam;
    a pointer that generates a pointer beam that is selectively positioned to identify the feature; and
    a control system that controls the mover assembly to move the direction of the measurement beam until the measurement beam is approximately directed at the identified feature, the measurement beam being used to measure the identified feature.

2. The measurement assembly of claim 1 wherein the pointer beam directed at the surface forms a pointer spot on the surface; and wherein the control system controls the mover assembly to move the direction of the measurement beam until the measurement beam is approximately directed at the pointer spot.

3. The measurement assembly of claim 2 wherein the control system controls the mover assembly to move the direction of the measurement beam so that the measurement beam approximately follows the pointer spot on the surface.

4. The measurement assembly of claim 2 wherein the pointer includes an indicator that is controlled to selectively indicate to the metrology system when the pointer spot is approximately directed at the feature on the surface to be measured.

5. The measurement assembly of claim 4 wherein the indicator is in electrical communication with the metrology system.

6. The measurement assembly of claim 5 wherein the control system controls the mover assembly to move the direction of the measurement beam by use of the electrical communication with the pointer.

7. The measurement assembly of claim 2 wherein movement of the pointer beam in a predetermined path indicates the feature.

8. The measurement assembly of claim 2 further comprising a feedback device that provides feedback information to the control system regarding the pointer spot.

9. The measurement assembly of claim 8 wherein the feedback device includes a detectable area, and wherein the control system determines a direction of the pointer spot inside the detectable area of the feedback device.

10. The measurement assembly of claim 8 wherein the control system receives the feedback information from the feedback device and determines how much movement is required for the measurement beam to be directed at the pointer spot.

11. The measurement assembly of claim 10 wherein the pointer beam is pulsed so that the pointer spot on the surface is identified by the control system from the feedback information.

12. The measurement assembly of claim 1 wherein the mover assembly moves the metrology system in two rotational degrees of freedom.

13. The measurement assembly of claim 1 wherein the pointer is a hand-held device.

14. The measurement assembly of claim 1 wherein the selective positioning of the pointer beam occurs independently from the movement of the direction of the measurement beam.

15. A measurement assembly for measuring a feature on a surface, the measurement assembly comprising:
    a metrology system that generates a measurement beam for measuring the feature on the surface;
    a mover assembly that selectively moves at least a portion of the metrology system to move a direction of the measurement beam;
    a hand-held pointer that generates a pointer beam that is selectively directed at the surface to form a pointer spot on the surface;
    a camera having a field of view, the camera providing feedback information relating to the field of view; and
    a control system that receives the feedback information from the camera, determines if the pointer spot is within the field of view of the camera, and if so, determines how much movement is required for the measurement beam to be directed at the pointer spot, and wherein the control system controls the mover assembly to move the direction of the measurement beam until the measurement beam is approximately directed at the pointer spot.

16. The measurement assembly of claim 15 wherein the control system controls the mover assembly to move the direction of the measurement beam so that the measurement beam approximately follows the pointer spot on the surface.

17. The measurement assembly of claim 16 wherein the pointer includes an indicator that is controlled to selectively indicate to the metrology system when the pointer spot is directed at the feature on the surface to be measured.

18. The measurement assembly of claim 15 wherein the pointer beam is pulsed so that the pointer spot is identified by the control system from the feedback information.

19. The measurement assembly of claim 15 wherein the selective directing of the pointer beam occurs independently from the movement of the direction of the measurement beam.

20. A method for measuring a feature on a surface, the method comprising the steps of:
    generating a measurement beam with a metrology system;

selectively moving a direction of the measurement beam with a mover assembly;

directing a pointer beam from a pointer at the feature to identify the feature; and controlling the mover assembly with a control system to move the direction of the measurement beam until the measurement beam is approximately directed at the identified feature.

21. The method of claim 20 wherein the step of directing the pointer beam forms a pointer spot on the surface; and wherein the step of controlling includes moving the direction of the measurement beam until the measurement beam is approximately directed at the pointer spot.

22. The method of claim 21 wherein the step of controlling includes controlling the mover assembly to move the direction of the measurement beam so that the measurement beam approximately follows the pointer spot on the surface.

23. The method of claim 21 further comprising the step of generating feedback information regarding the pointer spot with a feedback device, wherein the feedback information is provided to the control system.

24. The method of claim 21 wherein the step of controlling includes the step of determining how much movement is required for the measurement beam to be directed at the pointer spot.

25. The method of claim 20 wherein the step of directing a pointer beam includes moving the pointer beam in a predetermined path to indicate the feature.

26. A method for manufacturing a structure, comprising the steps of:

producing the structure based on design information;

obtaining shape information of structure by using of the method of claim 20; comparing the obtained shape information with the design information.

27. The method for manufacturing the structure according to claim 26 further comprising reprocessing the structure based on the comparison result.

28. The method for manufacturing the structure according to claim 27, wherein reprocessing the structure includes producing the structure over again.

29. The method of claim 20 wherein the step of directing the pointer beam occurs independently from the step of selectively moving the direction of the measurement beam.

30. A pointer that identifies a feature on a surface which is then measured by using of a metrology system, the metrology system generating a measurement beam, the metrology system including a mover assembly that selectively moves at least a portion of the metrology system to move a direction of the measurement beam, and a control system that controls the mover assembly to move the direction of the measurement beam until the measurement beam is approximately directed at the feature, the pointer comprising:

a pointer laser source that generates a pointer beam that is selectively positioned to identify the feature on the surface; and an indicator that is controlled to selectively indicate to the metrology system when a pointer spot is approximately directed at the feature on the surface to be measured, the indicator being in electrical communication with the metrology system.

31. The pointer of claim 30 wherein the pointer beam is positioned independently from the movement of the direction of the measurement beam.

\* \* \* \* \*